Sept. 17, 1946.　　　P. P. DANIEL　　　2,407,951
ORIFICE PLATE CARRIER
Filed Oct. 18, 1943
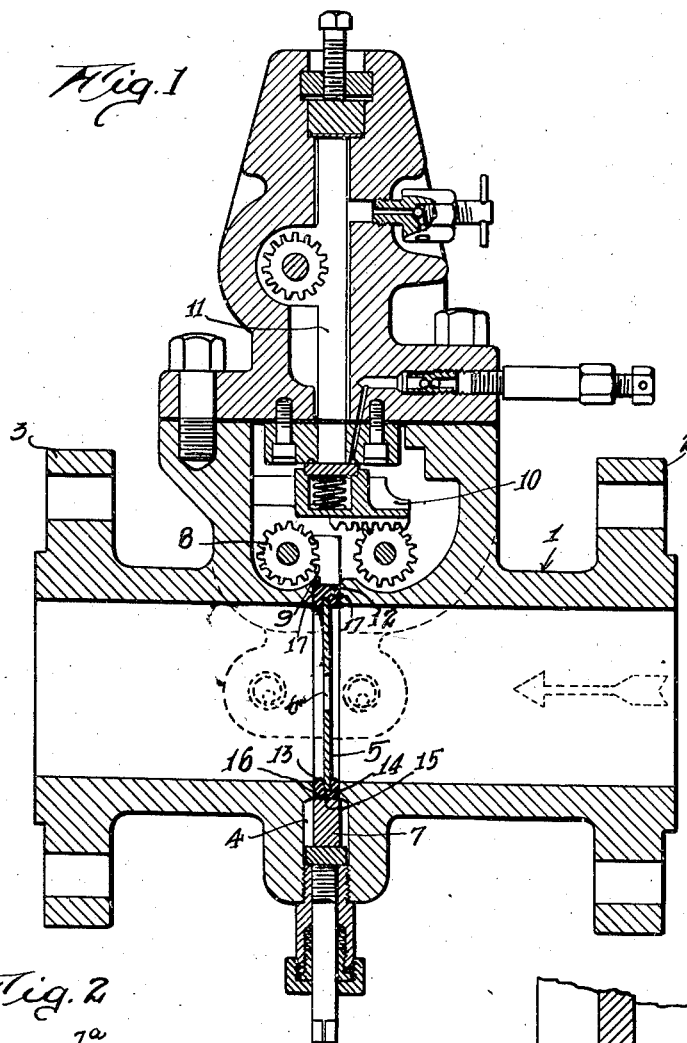
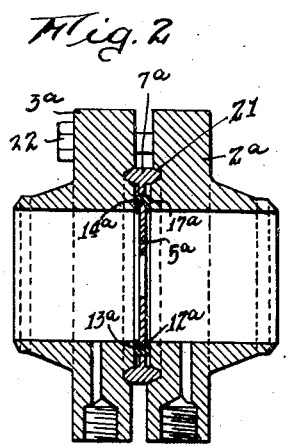
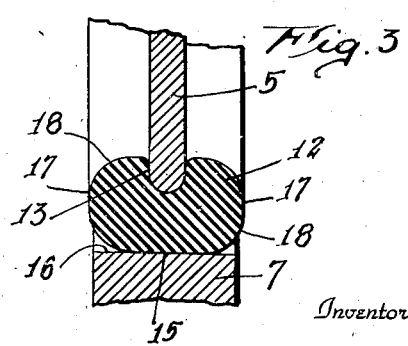
Inventor
Paul P. Daniel
By Lyon & Lyon
Attorneys Patented Sept. 17, 1946

2,407,951

UNITED STATES PATENT OFFICE 2,407,951

ORIFICE PLATE CARRIER

Paul P. Daniel, Los Angeles, Calif.

Application October 18, 1943, Serial No. 506,722

2 Claims. (Cl. 138—44)

This invention relates to plate carriers, and more particularly to plate carriers adapted to be positioned within a conduit through which fluid is passing under pressure.

In the first embodiment of my invention as illustrated in the accompanying drawing, I have indicated the plate carrier embodying my invention as adapted in an orifice fitting of the type utilized for determining the flow of a fluid through a conduit in which the orifice fitting is positioned.

It is an object of my invention to provide a plate carrier or holder adapted to position a plate or orifice disc within the line of flow of the fluid in a conduit.

Another object of my invention is to provide a plate carrier adapted for supporting a plate or orifice disc in line of flow of fluid through a conduit wherein there is provided a means for supporting and positioning the plate in the carrier which also provides a means for sealing the plate so as to prevent flow of gas or fluid around the plate.

Other objects and advantages of this invention it is believed will be apparent from the following detailed description of a preferred embodiment thereof as illustrated in the accompanying drawing.

In the drawing:

Figure 1 is a sectional elevation of an orifice fitting of the removable plate type in which my invention is incorporated.

Figure 2 is a side elevation principally in vertical midsection of a modified form of fitting in which the plate carrier embodying my invention is incorporated.

Figure 3 is a fragmental sectional detail of the plate and retaining ring.

In the preferred embodiment of my invention as illustrated in Figure 1, I have illustrated my invention as being incorporated within an orifice fitting of the removable plate type as, for example, illustrated in the Letters Patent granted to me, No. 1,996,192, of April 2, 1935, for Valve.

In this modification of my invention there is provided a fitting 1 which is adapted to be secured in a pipe line by any suitable means as by the opposed flanges 2 and 3. Formed within this fitting there is a transverse chamber 4 adapted to receive an orifice plate 5 having an orifice 6 formed therein. The orifice plate 5 is carried in a carrier 7 which is adapted to be moved to and from position within the annular chamber by means of gears 8 which mesh with teeth 9 formed on the opposed edges of the carrier 7. By means of the gears 8 the carrier 7 and the plate 5 are adapted to be moved to and from position across the path of fluid flowing through the fitting 1 and translated through a valve member 10 into a chamber 11 where the carrier may be withdrawn for replacement, change or repair of the plate 5 as may be desired after the valve 10 has been closed to prevent escape of fluid from the line within which the fitting 1 is mounted.

In removable orifice fittings one of the principal difficulties encountered is in maintaining the plate 5 in fluid-tight relation within the carrier 7, the fluid within the fitting 1 does not flow around the edges of the said plate, or so that the carrier and the plate 5 may be easily removed from position across the line of flow. In order to overcome this difficulty in accordance with the present invention, I mount the plate 5 at its peripheral edge 12 within a recess 13 formed in a ring 14, the ring being in turn loosely mounted within the annulus of the carrier 7 with its outer periphery 15 fitting within the inner periphery 16 of the carrier 7.

The ring 14 freely floats within the carrier 7. The ring 14 may be formed of rubber, "neoprene," or other synthetic rubber or other suitable flexible material, and is of a width slightly greater than the width of the carrier 7 or the recess formed in the fitting 1 into which it is carried by the carrier 7. In order to permit the ring 14 to be carried into such a narrow recess, its outer edges are curved as indicated at 18 so that it may be compressed in passing into the narrower recess. By so compressing the ring it forms a fluid-tight seal with the plate 5 on the interior of the recess 13, and also with both faces of the recess defining the two opposed seats 17. This mounts the disc in fluid-tight relation within the fitting 1 irrespective of the direction of flow of the fluid therethrough.

In accordance with my invention, however, I am not limited to the use of rubber, "neoprene," or synthetic rubber, for forming the seal as other flexible sealing mediums may be employed in precisely the same manner as, for example, impregnated fabrics, plastic rings, and the like, but my invention is particularly directed to the inner position between the peripheral edge 12 of such a plate 5 as the carrier 7 of a flexible ring which is freely mounted within the annulus of such a carrier so that it may freely move against a seat 17 to effect a seal.

In the modified form of my invention as illustrated in the accompanying drawing, similar parts have been indicated with similar numerals with the addition of an exponent *a* thereto.

In this modification of my invention I have indicated the invention as adapted to a permanent type of orifice plate mounting where the plate 5a is mounted between two flanged fittings 2a and 3a and where the carrier 7a is preformed to fit recesses 21 formed in the opposed flanges 2a and 3a. In this type of structure the flanged fittings are secured together by means of securing bolts 22 which act to clamp the carrier 7a within the sealing recesses 21. As in the previous modification of my invention the plate 5a is mounted at its peripheral edge 12a within a recess 13a formed in the flexible holding ring 14a which in turn is mounted within the annular opening formed in the carrier 7a. In this modification of my invention the flexible ring 14a seats against the surface 17a of one of the fittings depending upon the direction of flow of the fluid therethrough. In many cases it is desirable to stop flow of fluid through a conduit, in which case a fitting similar to that illustrated in Figure 2 may be employed but instead of utilizing an apertured orifice plate 5a as indicated, a solid plate is utilized having no orifice opening therein. My invention contemplates mounting of this type of plate in either of the types of fitting illustrated and where it is desired to obstruct or prevent flow through the fitting.

While I have illustrated the plate carrier embodying my invention as mounted in a particular type of orifice meter fitting wherein the plate is shifted through the use of gears, it will be obvious that this detail forms no part of my invention but that the plate carrier may be moved or shifted by any suitable means commonly employed in this art.

Having fully described my invention, it is to be understood that I do not wish to be limited to the details herein set forth, but my invention is of the full scope of the appended claims.

I claim:

1. In a device of the class described, the combination of a plate carrier adapted to be positioned in a flow line, an orifice plate carried by the carrier within an opening formed therethrough, and a sealing ring interposed between the carrier and the plate within the said opening, said sealing ring being internally grooved to receive the peripheral edge of the orifice plate and of an external diameter to freely fit the said carrier opening, and the sealing ring being of thickness greater than the thickness of the carrier.

2. In a device of the class described, the combination of a plate carrier ring adapted to be removably positioned within a transverse chamber formed in a fitting in a flow line, an orifice plate positioned within the central opening of the carrier ring, and a sealing ring interposed between the carrier ring and the plate within the said opening, said sealing ring being internally grooved to receive the peripheral edge of the orifice plate, and of an external diameter to freely fit the said carrier ring opening, and the ring having a thickness greater than the thickness of the carrier ring.

PAUL P. DANIEL.